(12) United States Patent
Kilper et al.

(10) Patent No.: US 7,134,544 B1
(45) Date of Patent: Nov. 14, 2006

(54) CONVEYOR BELT SYSTEM WITH TAKE-UP DEVICE

(75) Inventors: John Kilper, St. Charles, MO (US); Christopher Williams, Foristell, MO (US)

(73) Assignee: FKI Logistex, Inc., St. Louis, MO (US)

( * ) Notice: Subject to any disclaimer, the term of this patent is extended or adjusted under 35 U.S.C. 154(b) by 0 days.

(21) Appl. No.: 11/191,390

(22) Filed: Jul. 28, 2005

(51) Int. Cl.
*B65G 23/44* (2006.01)

(52) U.S. Cl. .................. 198/813; 198/835

(58) Field of Classification Search ......... 198/810.04, 198/813, 815, 835
See application file for complete search history.

(56) References Cited

U.S. PATENT DOCUMENTS

| | | | | |
|---|---|---|---|---|
| 2,098,573 | A | * | 11/1937 | Dingle .................. 198/814 |
| 2,907,450 | A | * | 10/1959 | Reid .................... 198/810.04 |
| 3,946,861 | A | | 3/1976 | Sandefur |
| 4,128,164 | A | | 12/1978 | Sandberg |
| 4,253,343 | A | * | 3/1981 | Black et al. ............ 198/814 |
| 4,629,062 | A | * | 12/1986 | Silverthorn et al. ...... 198/813 |
| 4,657,131 | A | | 4/1987 | Brychta et al. |
| 4,720,008 | A | | 1/1988 | Ufland |
| 5,038,919 | A | | 8/1991 | Harston |
| 5,190,145 | A | | 3/1993 | Ledginham et al. |
| 5,244,077 | A | * | 9/1993 | Deschner ................ 198/835 |
| 5,310,047 | A | | 5/1994 | Ledingham |
| 5,370,383 | A | * | 12/1994 | Kulpa .................. 198/835 |
| 5,501,320 | A | | 3/1996 | Chipcase |
| 5,632,372 | A | | 5/1997 | Steinbuchel, IV et al. |
| 6,360,879 | B1 | | 3/2002 | Crawford |

* cited by examiner

*Primary Examiner*—James R. Bidwell
(74) *Attorney, Agent, or Firm*—Polster, Lieder, Woodruff & Lucchesi, L.C.

(57) ABSTRACT

A conveyor system having a frame, a drive sprocket rotatably mounted to the frame, and a tail pulley rotatably mounted to the frame opposite the drive sprocket. A continuous belt engages with the drive sprocket and tail pulley with a catenary take-up arrangement having an upper conveying portion and a lower return portion. A snub idler may be engaged with the return portion of the belt so that the belt properly engages the drive sprocket. A motor couples with the drive sprocket, the motor being capable of driving the belt in forward and reverse directions. A take-up device engages with the return portion of the belt so that the belt is capable of running in forward and reverse directions.

22 Claims, 4 Drawing Sheets

US 7,134,544 B1

CONVEYOR BELT SYSTEM WITH TAKE-UP DEVICE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to conveyor systems and more particularly to a take-up device for conveyor belt systems.

Conveyor belt systems are used to convey various commercial products. As shown in FIG. 1, conveyors typically include a frame 1 with a tail pulley 2 and drive sprockets 3 on opposite ends of the frame 1 with a continuous or endless belt 4 that runs around the pulley 2 and sprockets 3 and along the length of the conveyor frame 1. The belt 4 is in the form of a loop with an upper conveying portion 5, which conveys product, and a lower return portion 6 below and generally parallel to the conveying portion 5. Typically, a snub idler 7 is placed along the return portion 6 near the drive sprockets 3 to ensure that the belt 4 properly engages the drive sprockets 3. A certain amount of excess belt is usually provided which is allowed to sag 8 in the return portion 6 between the tail pulley 2 and the snub idler 7. The belt within the sag provides tension in the belt 4 so that the belt 4 properly engages the drive sprockets 3. This arrangement is generally referred to as a catenary take-up.

However, this typical arrangement only allows the conveyor belt system to convey in one direction. Often, it is desirable for a conveyor to be bi-directional or have "jog reverse" capability, which means that the conveyor normally runs in a forward direction but can be manually engaged to run in reverse. As shown in FIG. 2, if a conveyor belt system arranged in a catenary take-up is reversed in direction, the drive sprockets 3 pull the excess belt 4 from the return portion 6 to the conveying portion 5. This causes the belt 4 to wrinkle and disengage from the drive sprockets 3 and potentially cause damage to the belt 4, drive sprockets 3, and other parts of the system. In addition to the excess belt provided, the belt gradually stretches and elongates during operation due to wear and tear and various other conditions, such as temperature or humidity. This only adds to the problem.

Consequently, other conveyor system arrangements, such as a center drive arrangement, are typically used whenever it is necessary for a conveyor system to have bidirectional or jog reverse capability. This arrangement requires that the drive sprockets be placed in the middle of the return portion. It also requires additional take-up pulleys to keep proper tension on the belt, and is much more expensive than the simpler catenary take-up arrangement.

What is then needed is a conveyor system with a catenary take-up arrangement that is bidirectional and/or has jog reverse capability.

SUMMARY OF THE INVENTION

One embodiment of the invention is a conveyor system having a frame, a continuous belt about the frame and a catenary take-up arrangement having an upper conveying portion and a lower return portion, a drive means for driving the belt in forward and reverse, and a take-up means for engaging with the return portion of the belt so that the belt is capable of running in forward and reverse directions.

The foregoing and other features, and advantages of the invention as well as embodiments thereof will become more apparent from the reading of the following description in connection with the accompanying drawings.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
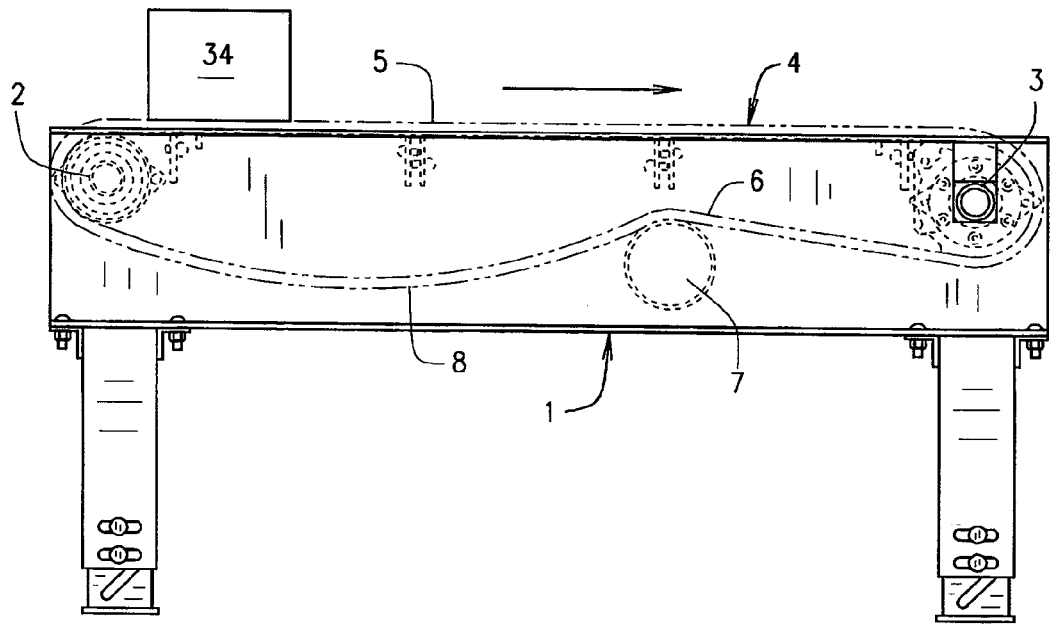
FIG. 1 is a elevation view of a typical conveyor system with a catenary take-up arrangement.
Figure 2:
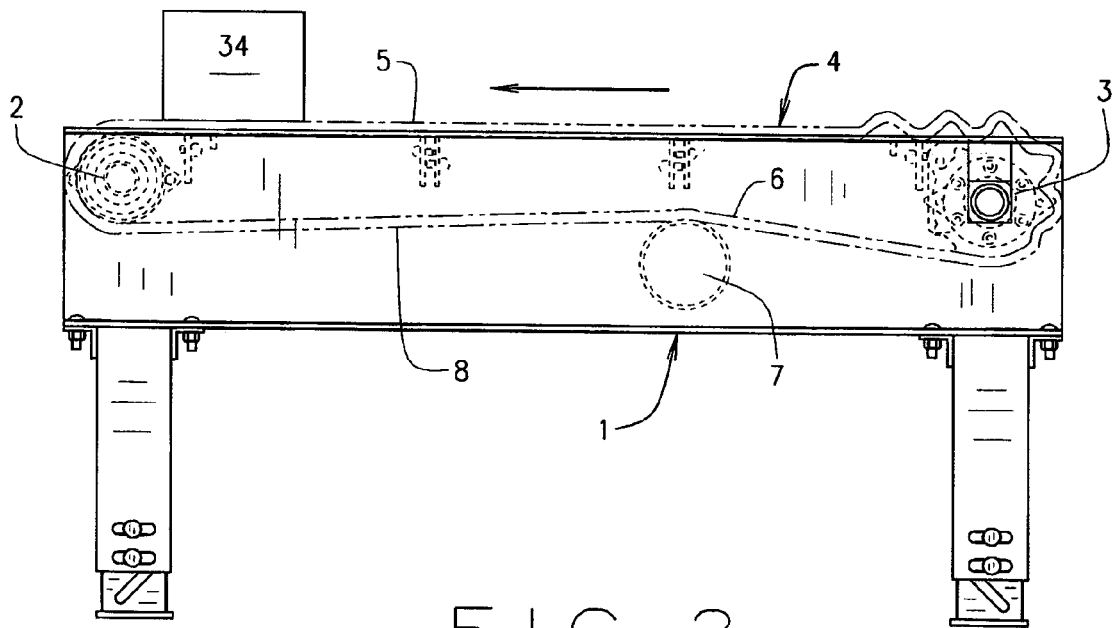
FIG. 2 is a elevation view of a typical conveyor system with a catenary take-up arrangement when the conveyor is reversed.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As shown in FIGS. 3–7, an embodiment of the present invention, generally referred to as a conveyor belt system 10, includes a frame 12 with a drive assembly 14 and a tail assembly 16 on opposite ends of the frame 12 and a snub idler 18 near the drive assembly 14. A continuous belt 20 runs around the assemblies 14, 16, and 18 in a catenary arrangement along the length of the frame 12 supported by belt supports 21, which span between the side members 28. Belt guides 22 are mounted along the edges of the belt supports 21 to center the belt 20 between the side members 28. The conveyor belt system 10 also includes a take-up device 24 that engages the belt 20 so that the belt 20 is capable of running in forward and reverse directions.

The frame 12 includes legs 26 that support side members 28. Cross members 30 attach between both ends of the side members 28. The belt supports 21 attach to the inside surface of the side members 28 for supporting the belt 20 during operation.

The belt 20 is in the form of a loop with an upper conveying portion 32, which conveys product 34, and a lower return portion 36 below and generally parallel to the conveying portion 32. In the present embodiment, the belt 20 is a continuous or endless belt having a plurality of plastic segments hingedly connected with plastic pins and in the form of a loop. The segments slide on the smooth surface defined by the belt supports 21. Each segment has a recess on the bottom surface to engage teeth 43 on sprockets 44 of the drive assembly 14. Any type of continuous or endless belt, which are well known to those skilled in the art, can be used in the present invention.

A certain amount of excess belt 20 is provided, which is allowed to sag in of the return portion 36. The sag provides the initial tension in the belt 20 about the sprockets 44 that keep the belt 20 from disengaging from the sprockets 44 during operation. A snub idler 18 engages and raises the return portion 36 of the belt 20 so that the belt 20 wraps around more teeth 43 of the sprockets 44 for better engagement, hereby referred to as "belt wrap engagement". Without the snub idler 18, the belt 20 simply hangs freely in the return portion 36 the belt 20 and engages fewer teeth of the sprockets 44, which can cause the belt 20 to disengage from the sprockets 44 during operation. The distance between the snub idler 18 and the sprockets 44 is always less than the distance between the snub idler 18 and the tail assembly 16. As a result, the excess belt 20 collects in a sag portion 38 between the tail assembly 16 and the snub idler 18. This arrangement is generally referred to as a catenary take-up.

For various reasons, a snub idler 18 may not be used in alternate embodiments. For example, short conveyor systems may not have enough room or need for a snub idler 18.

Figure 3:
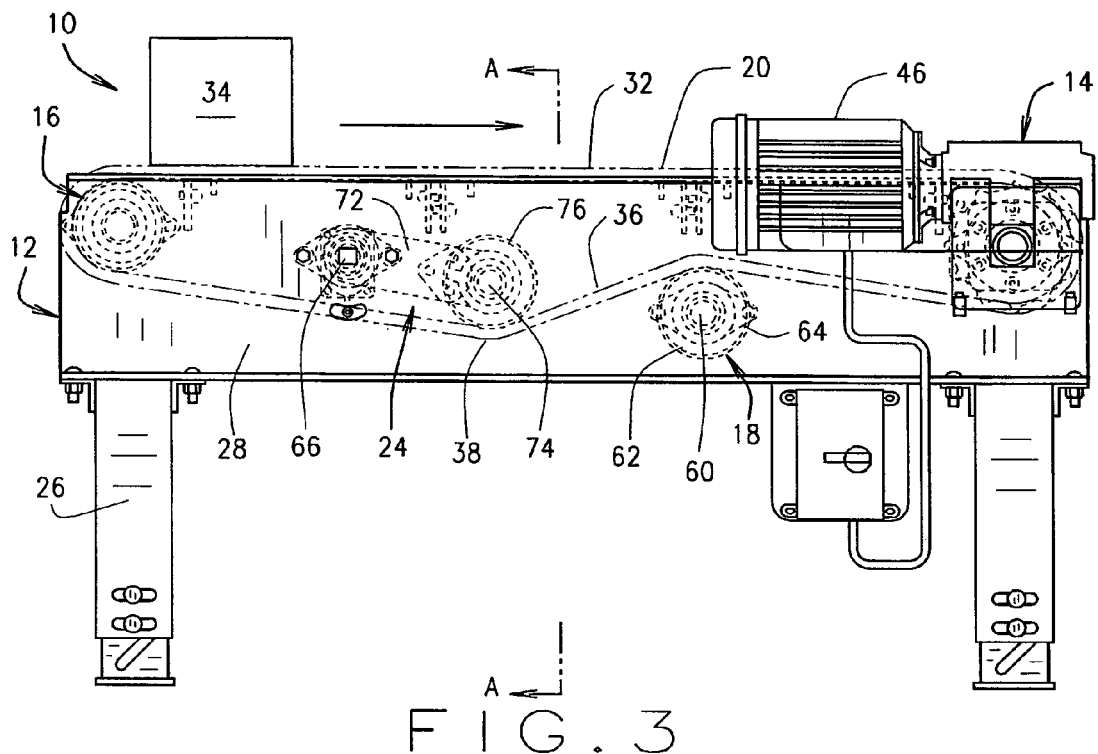
FIG. 3 is a elevation view of the conveyor belt system of the present invention.
Figure 4:
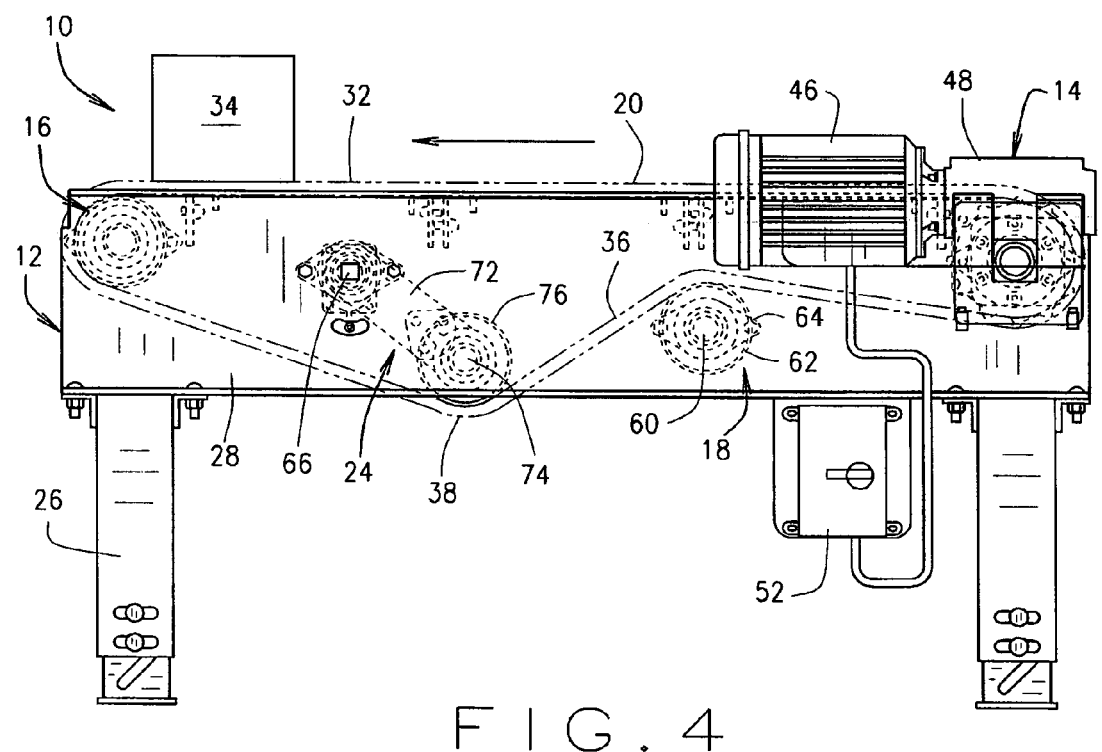
FIG. 4 is a elevation view of the conveyor belt system of the present invention with an elongated belt.
Figure 5:
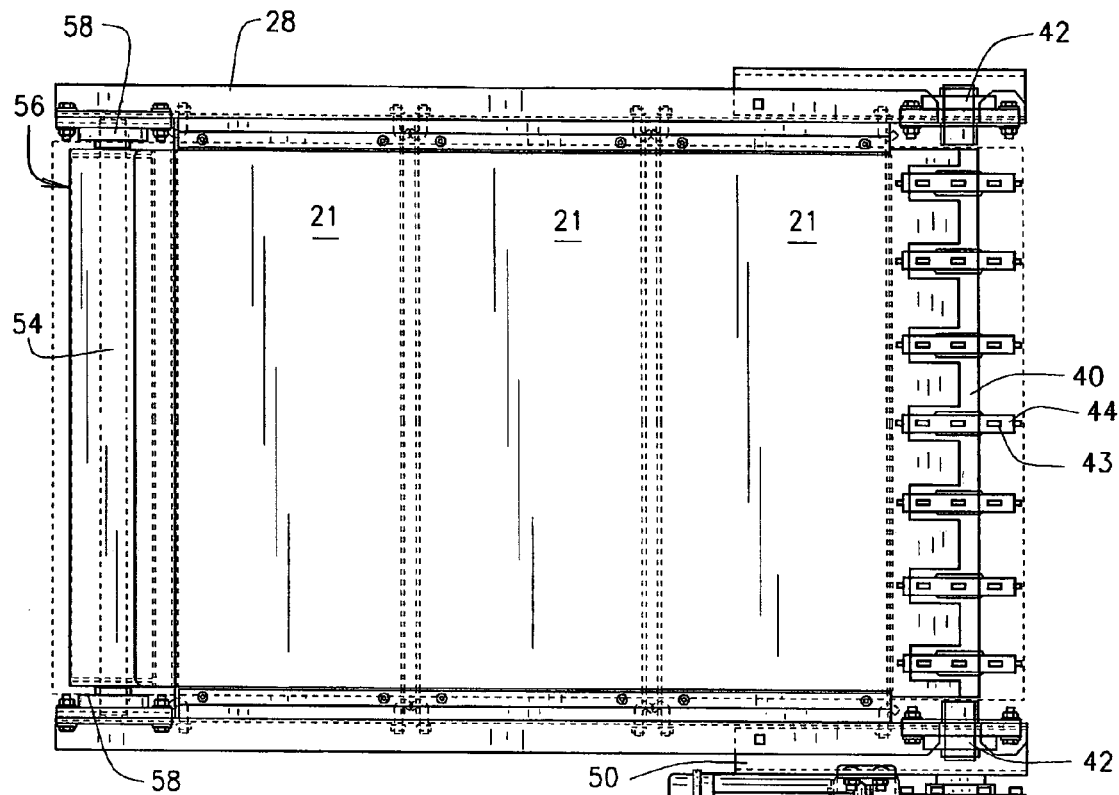
FIG. 5 is an overhead view of the conveyor belt system of the present invention.

As shown in FIGS. 3–5, the drive assembly 14 includes a drive shaft 40 that is rotatably mounted to the side members 28 of the frame 12 with bearings 42. A plurality of sprockets 44 is mounted along intervals of the drive shaft 40 for engaging the belt 20. One end of the drive shaft 40 is engaged with a drive motor 46 and gear reducer 48 for driving the shaft 40, sprockets 44, and belt 20. The motor 46 and gear reducer 48 are mounted to the frame 12 with a bracket 50 and connected to an appropriate power source (not shown) and controls 52. The motor 46 and controls 52 of the drive assembly 14 are capable of driving the belt 20 in both forward and reverse directions, preferably as a jog reverse capability. This capability allows the belt 20 to normally run in a forward direction but run in a reverse direction when an operator manually engages the controls 52.

As shown in FIGS. 3–5, the tail assembly 16 includes a tail shaft 54 and tail pulley 56 that are rotatably attached with bearings 58 to the side members 28 at the end of the frame 12 opposite the drive assembly 14. The tail pulley 56 is a cylindrical roller fixed along the length of the tail shaft 54 so that the pulley 56 frictionally engages the belt 20. The shaft 54 and pulley 56 rotate freely to provide support to the belt 20 as it runs in forward or reverse directions.

As shown in FIGS. 3–4, the snub idler 18 includes a snub shaft 60 and snub pulley 62 rotatably mounted with bearings 64 mounted to the side members 28 of the frame 12 near the drive assembly 14. The snub pulley 62 is a cylindrical roller fixed along the length of the snub shaft 60 so that the pulley 62 frictionally engages the return portion 36 of belt 20. The snub shaft 60 and snub pulley 62 rotate freely to provide support to the belt 20 as it runs in forward or reverse directions. As mentioned above, the snub idler 18 engages the belt 20 so that the belt engages a larger portion of the drive assembly 14. Accordingly, the excess belt 20 sags in a sag portion 38 between the tail assembly 16 and the snub idler 18.

Figure 6:
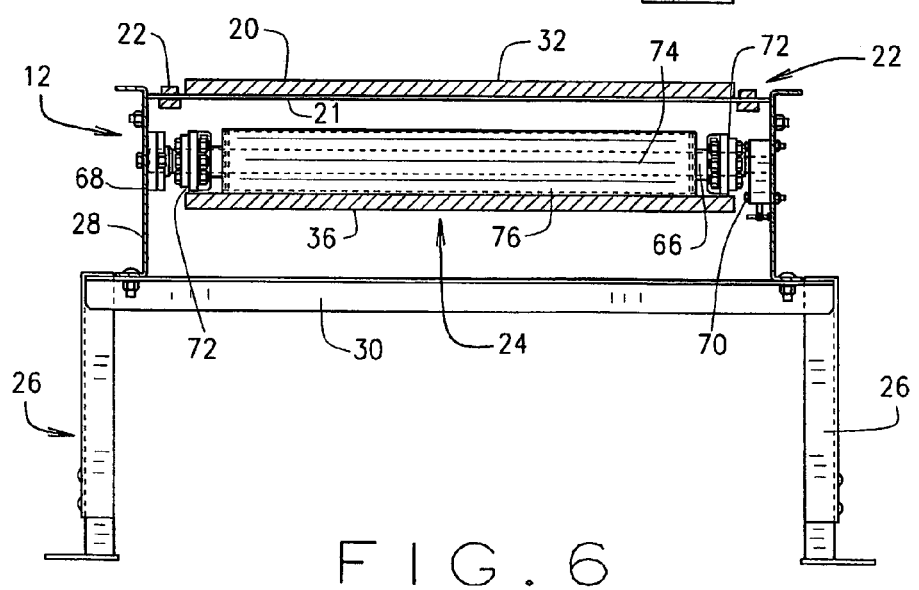
FIG. 6 is a section view of the conveyor belt system of the present invention along A—A of FIG. 3.

As shown in FIGS. 3, 4 and 6, the take-up device 24 includes a ratchet shaft 66 pivotally mounted at one end with a bearing 68 to the side member 28 of the frame 12 and at the other end to a ratchet assembly 70. Arms 72 extend from near both ends of the ratchet shaft 66 and connect at the opposite end to a take-up pulley shaft 74 and take-up pulley 76. The take-up pulley 76 is a cylindrical roller fixed along the length of the ratchet shaft 66 so that the pulley 76 supportively engages the return portion 38 of the belt 20. The take-up shaft 74 and pulley 76 rotate freely to allow the belt to run in forward or reverse directions.

The take-up device 24 pivots downward, or clockwise as shown in FIGS. 3 and 4, via gravity about the ratchet shaft 66 so that the take-up pulley 76 follows the belt down into the sag portion 38. During normal operation, the ratchet assembly 70 allows unidirectional rotation so that the take-up device 24 pivots downward only.

Figure 7:
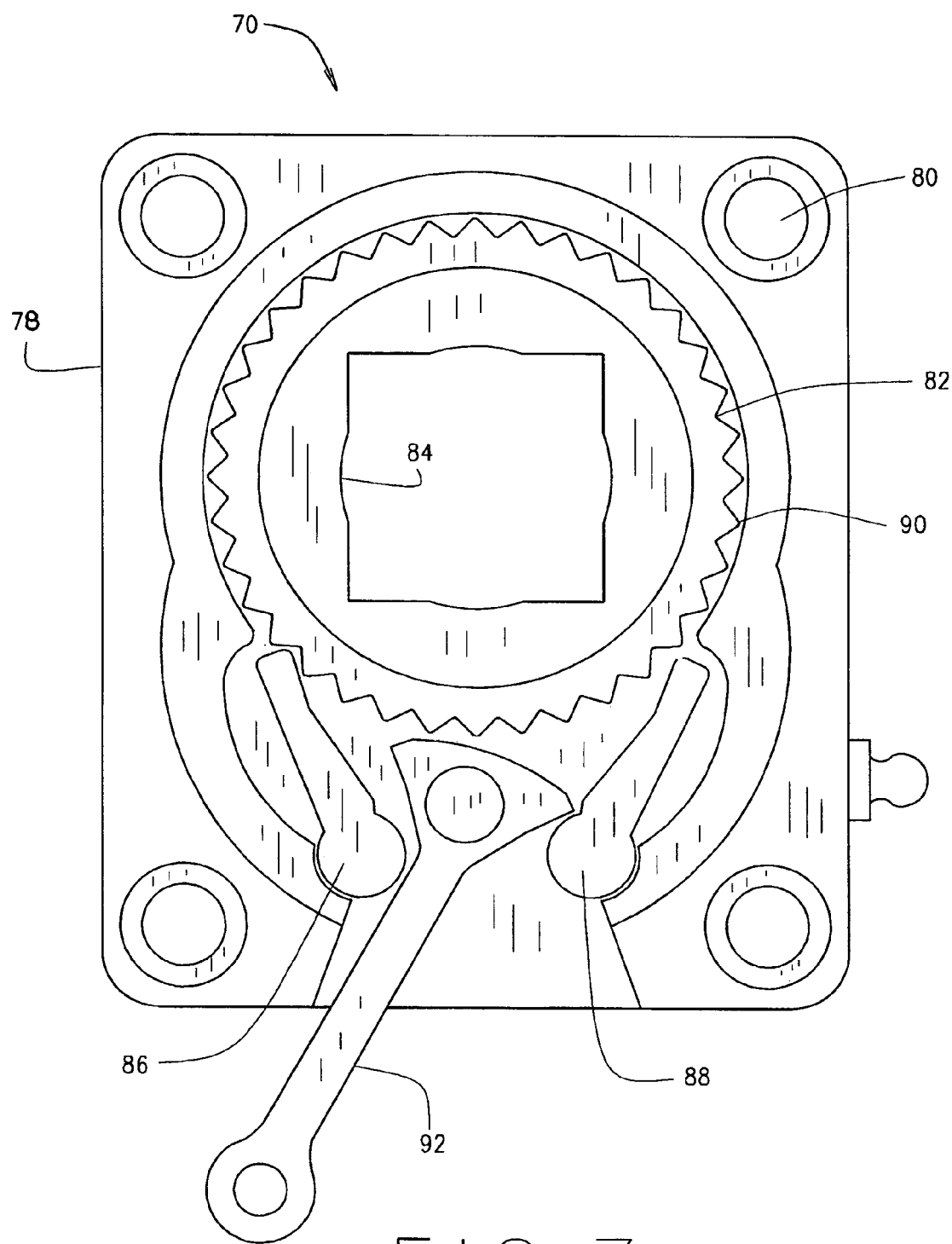
FIG. 7 is a front view of a ratchet assembly of the present invention.

As shown in FIG. 7, the ratchet assembly 70 is a bi-directional ratchet clutch, such as the ratchet clutch manufactured by Lowell Corporation. The ratchet assembly 70 includes a body 78 mounted to the frame 12 using mounting holes 80. A gear 82 rotationally mounts within a recess of the body 78. The gear 82 defines a bore 84 that engages with the ratchet shaft 66. A pair of pawls 86 and 88 pivotally mount within the recess of the body 78 so that they can engage teeth 90 of the gear 82. Pawl springs (not shown) bias the pawls 86 and 88 toward engagement with the teeth 90. A lever 92 engages the pawls 86 and 88 so that only one pawl engages the teeth 90 at a time. In the embodiment of FIG. 7, pawl 86 is engaged with the teeth 90 so that only clockwise motion of the gear 82 is possible. Clockwise motion of the gear 83 corresponds with downward pivoting of the take-up device 24 and counterclockwise motion corresponds with upward pivoting of the take-up device 24. An operator manually engages the lever 92 to switch the ratchet assembly 70 between clockwise motion and counterclockwise motion. Counterclockwise motion of the ratchet assembly is provided for maintenance of the belt 20 and take-up device 24. Those skilled in the art will recognize that other embodiments of the ratchet assembly can be used.

By limiting the direction that the take-up device 24 pivots, excess belt is not allowed to accumulate anywhere else but in the sag portion 38. This prevents the belt 20 from wrinkling and disengaging from the drive assembly 14 when run in the reverse direction. Therefore, the take-up device 24 allows the conveyor system 10 to run the belt in both forward and reverse direction in a catenary arrangement. As previously mentioned, the belt 20 gradually stretches and elongates during operation. As the belt 20 elongates, the take-up device 24 pivots further downward, thereby, following the increasing sag in the belt 20. Therefore, the take-up device 24 accommodates the normal stretching and elongating of the belt, while allowing the conveyor system 10 to run the belt 20 in both a forward and reverse direction.

In operation, the operator engages the controls 52 to turn on the conveyor system 10 and start the conveyor system 10 running in the forward direction. As such, the motor 46 and gear reducer 48 turn the drive shaft 40 and sprockets 44 clockwise. In turn, the sprockets 44 engage the belt 20 and run the belt 20 in a forward direction along the length on the frame and around the snub idler 18, and tail assembly 16. Concurrently, the take-up device 24 follows the belt 20 downward into the sag portion 38. Product 34 is conveyed along the belt 20. When necessary, the operator engages the controls 52 to reverse the direction of the conveyor belt 20. The motor 46 and gear reducer 48 reverse the rotation of the drive shaft 40 and sprockets 44 to run counterclockwise. As this happens, the ratchet assembly 70 prevents the take-up device 24 from pivoting counterclockwise, thereby keeping the excess belt securely in the sag portion 38. Subsequently, the operator engages the controls 52 to return the belt 20 to forward direction.

Changes can be made in the above constructions without departing from the scope of the invention, it is intended that all matter contained in the above description or shown in the accompanying drawings shall be interpreted as illustrative and not in a limiting sense.

What is claimed is:

1. A conveyor system comprising:
   a frame;
   a continuous belt about the frame in a catenary take-up arrangement having an upper conveying portion and a lower return portion;
   a drive means for driving the belt in forward and reverse; and
   a take-up means for engaging with the return portion of the belt so that the belt is capable of running in forward and reverse; and
   a ratchet assembly coupled with the take-up means, the ratchet assembly being capable of limiting the take-up means to downward motion.

2. The conveyor system of claim 1 wherein the drive means comprises:
   at least one drive sprocket rotatably mounted to the frame and engaged with the belt;
   a tail pulley rotatably mounted to the frame opposite the drive assembly and engaged with the belt; and
   a motor coupled with at least one drive sprocket, the motor being capable of driving the belt in forward and reverse directions.

3. The conveyor system of claim 2 wherein the drive means further comprises a snub idler engaged with the return portion of the belt to increase the belt wrap engagement between the belt and at least one sprocket.

4. The conveyor system of claim 1 wherein the take-up means comprises:
   a ratchet shaft pivotally mounted to the frame;
   an arm mounted to the ratchet shaft;
   a take-up pulley rotatably mounted to the arm and engaged with the belt; and
   the ratchet assembly being coupled between the ratchet shaft and the frame.

5. The conveyor system of claim 1, wherein the ratchet assembly is capable of being engaged by an operator to allow upward motion of the take-up device.

6. The conveyor system of claim 1, wherein the ratchet assembly is capable of being engaged by an operator to allow upward motion of the take-up device.

7. The conveyor system of claim 1, wherein the ratchet assembly is a bi-directional ratchet clutch.

8. A conveyor system comprising:
   a frame;
   at least one drive sprocket rotatably mounted to the frame;
   a tail pulley rotatably mounted to the frame opposite said at least one drive sprocket;
   a continuous belt engaged with said at least one drive sprocket and tail pulley in a catenary take-up arrangement having an upper conveying portion and a lower return portion;
   a snub idler engaged with the return portion to increase the belt wrap engagement between the belt and said at least one sprocket;
   a motor coupled with at least one drive sprocket, the motor being capable of driving the belt in forward and reverse directions; and
   a take-up device engaged with the return portion of the belt so that the belt is capable of running in forward and reverse directions; and
   wherein the take-up device is coupled with a ratchet assembly that is capable of limiting the take-up device to downward motion.

9. The conveyor system of claim 8, wherein the ratchet assembly is capable of being engaged by an operator to allow upward motion of the take-up device.

10. The conveyor system of claim 8, wherein the ratchet assembly is a bi-directional ratchet clutch.

11. The conveyor system of claim 8 wherein the take-up device comprises:
    a ratchet shaft pivotally mounted to the frame;
    an arm mounted to the ratchet shaft;
    a take-up pulley rotatably mounted to the arm and engaged with the belt; and
    the ratchet assembly being coupled between the ratchet shaft and the frame.

12. The conveyor system of claim 8, wherein the ratchet assembly is capable of being engaged by an operator to allow upward motion of the take-up device.

13. The conveyor system of claim 8, wherein the ratchet assembly is a bi-directional ratchet clutch.

14. A take-up device for a conveyor system in a catenary take-up arrangement comprising:
    a ratchet shaft pivotally mounted to a frame;
    an arm mounted to the ratchet shaft;
    a take-up pulley rotatably mounted to the arm and engaged with the belt; and
    a ratchet assembly coupled between the ratchet shaft and the frame, wherein the ratchet assembly is capable of limiting the take-up device to downward motion.

15. The conveyor system of claim 14 wherein the ratchet assembly is capable of being engaged by an operator to allow upward motion of the take-up device.

16. The conveyor system of claim 14 wherein the ratchet assembly is a bi-directional ratchet clutch.

17. A conveyor system comprising:
    a frame;
    a continuous belt about the frame in a catenary take-up arrangement having an upper conveying portion and a lower return portion;
    a drive assembly engaged with the belt, the drive assembly being capable of driving the belt in forward and reverse; and
    a take-up device engaged with the return portion of the belt so that the belt is capable of running in forward and reverse;
    a limiting means coupled with the take-up device, the limiting means being capable of limiting the take-up device to downward motion.

18. The conveyor system of claim 17, wherein the limiting means comprises a ratchet assembly.

19. The conveyor system of claim 18, the ratchet assembly being engagable by an operator to allow upward motion of the take-up device.

20. A take-up device for a conveyor system in a catenary take-up arrangement comprising:
    a ratchet shaft capable of being pivotally mounted to a frame;
    an arm mounted to the ratchet shaft;
    a take-up pulley rotatably mounted to the arm and engaged with the belt; and
    a ratchet assembly coupled between the ratchet shaft and the frame, wherein the ratchet assembly is capable of limiting the take-up device to downward motion.

21. The take-up device of claim 20 wherein the ratchet assembly is capable of being engaged by an operator to allow upward motion of the take-up device.

22. The take-up device of claim 20, wherein the ratchet assembly is a bi-directional ratchet clutch.

* * * * *